(12) United States Patent
Cheng

(10) Patent No.: US 9,721,327 B2
(45) Date of Patent: Aug. 1, 2017

(54) METHOD FOR AUTOMATICALLY ADJUSTING A PICTURE ACCORDING TO CONTENTS OF THE PICTURE AT TERMINAL EQUIPMENT

(71) Applicant: GUANG DONG OPPO MOBILE TELECOMMUNICATIONS CORP., LTD, Guangdong (CN)

(72) Inventor: Jun Cheng, Guangdong (CN)

(73) Assignee: GUANG DONG OPPO MOBILE TELECOMMUNICATIONS CORP., LTD, Guangdong (CN)

( * ) Notice: Subject to any disclaimer, the term of this patent is extended or adjusted under 35 U.S.C. 154(b) by 650 days.

(21) Appl. No.: 14/354,598

(22) PCT Filed: Apr. 28, 2013

(86) PCT No.: PCT/CN2013/074979
§ 371 (c)(1),
(2) Date: Apr. 28, 2014

(87) PCT Pub. No.: WO2014/040420
PCT Pub. Date: Mar. 20, 2014

(65) Prior Publication Data
US 2014/0300639 A1 Oct. 9, 2014

(30) Foreign Application Priority Data
Sep. 12, 2012 (CN) .......................... 2012 1 0335094

(51) Int. Cl.
*G06T 3/60* (2006.01)
*G06K 9/32* (2006.01)

(52) U.S. Cl.
CPC .............. *G06T 3/60* (2013.01); *G06K 9/3208* (2013.01)

(58) Field of Classification Search
None
See application file for complete search history.

(56) References Cited

U.S. PATENT DOCUMENTS

| | | | |
|---|---|---|---|
| 7,027,622 B2 * | 4/2006 | Pengwu | G06K 9/00268 382/118 |
| 2006/0204110 A1 * | 9/2006 | Steinberg | G06K 9/00228 382/224 |
| 2012/0294533 A1 * | 11/2012 | Ikenoue | H04N 1/3877 382/195 |

* cited by examiner

*Primary Examiner* — Jwalant Amin
(74) *Attorney, Agent, or Firm* — Kirton McConkie; Evan R. Witt

(57) ABSTRACT

A method for automatically adjusting a picture right according to contents of the picture at terminal equipment is provided, including the following steps: analyzing the picture, extracting information from the picture; calculating information to obtain weight, respectively calculating the sum of information weight in each of four directions; comparing sums of information weight of the four directions to obtain the direction with the maximum weight; and adjusting the picture in the direction with the maximum weight. The method judges the direction in which the picture should be adjusted according to contents of the picture itself, avoiding manual adjustment to the picture.

7 Claims, 1 Drawing Sheet

METHOD FOR AUTOMATICALLY ADJUSTING A PICTURE ACCORDING TO CONTENTS OF THE PICTURE AT TERMINAL EQUIPMENT

BACKGROUND OF THE INVENTION

The invention relates to terminal equipment, in particular to a method for automatically adjusting a picture according to contents of the picture at terminal equipment.

In the process of browsing pictures on a computer or mobile equipment, it is usual that some pictures are tilted (leftward or rightward) or upside down and need adjustment for normal browsing. At present, adjusting pictures basically depends on manual work toward the left or right; or on the mobile equipment supporting a gravity sensor, the sensor can be used to make adjustment. However, it is boring to manually make adjustment on many pictures. For adjustment through the gravity sensor, if the direction of a picture is incorrect in itself, then the relative direction is always wrong no matter how the user turns the mobile phone. The operation is tedious and bothered.

BRIEF SUMMARY OF THE INVENTION

The invention aims at overcoming defects of the prior technique and provides a method for automatically adjusting a picture according to contents of the picture at terminal equipment. The direction in which the picture should be adjusted is judged according to the contents of the picture itself, thus avoiding manual operation and solving the problem that the gravity sensor fails to make correction.

To fulfill the abovementioned aims, the invention adopts the following technical scheme: A method for automatically adjusting a picture according to contents of the picture at terminal equipment comprises the following steps:

a. analyzing contents of the picture and extracting key information of the picture by a system;

b. calculating the key information to obtain weight and respectively calculate the sum of key information weight in each of four directions;

c. comparing the sums of key information weight of the four directions to find out the direction with the maximum weight;

d. adjusting the picture in the direction with the maximum weight.

Furthermore, the key information includes human faces, characters, picture textural characteristics and colors, so weights calculated with the key information include human face information weight, character information weight, picture textural characteristic weight and color information weight.

Furthermore, the human face weight is classified into single-face information weight and multiple-face information weight.

Furthermore, the calculation of the single-face weight comprises:

Step 1.1. Reading the left eye, right eye and mouth by face recognition technology, establishing triangle relationship, defining a connecting line between the month and the gravity centre of the triangle as the vector direction of the face direction, then recognizing the face direction;

Step 1.2. Defining the face direction as the vector direction, obtaining included vector angles a1, a2, a3 and a4 between the vector direction and the four directions, then obtaining cosine values of the face direction in four directions of the picture, namely cos a1, cos a3, cos a2 and cos a4;

Step 1.3. Defining a cosine value as the image weight of a certain image in the picture, and when calculating the weight, setting the weight as 0 if the cosine value is smaller than 0.

Furthermore, the calculation of multi-face weight comprises: calculating the cosine value of each face, averaging, judging the weight according to the obtained average, and adjusting the picture in the direction with the maximum weight.

Furthermore, the calculation of the character information weight comprises:

Step 2.1. Recognizing characters in the picture and defining them as vector characters by image-text recognition technology;

Step 2.2. Obtaining four cosine values according to the included angles between the vector direction and the four directions;

Step 2.3. Defining a cosine value as the character weight of a certain character in the picture, and when calculating the weight, setting the weight as 0 if the cosine value is smaller than 0.

Furthermore, in the case of multiple characters, averages of character weight of the several character information in four directions are read and defined as the character weight of the multiple characters in the picture.

Furthermore, the calculation of the picture textural characteristic information weight comprises:

Step 3.1. Calculating the textural characteristic information of a classic picture and saving the obtained result in a database by the system;

Step 3.2. Extracting textural characteristic values on four directions of the picture to be adjusted, comparing the extracted values with the standard numerical values in the database;

Step 3.3. Respectively searching the most approximate standard textural characteristic values in four directions in the database;

Step 3.4. Respectively calculating the textural characteristic value in a certain direction, and calculating the textural characteristic weight according to the ratio of the corresponding standard textural characteristic value.

Furthermore, the calculation of the color information weight comprises:

Step 4.1. Calculating the color characteristic information of a classic picture and saving the obtained result in a database by the system:

Step 4.2. Extracting color characteristic values on four directions of the picture to be adjusted, comparing the extracted values with the standard numerical values in the database;

Step 4.3. Respectively searching the most approximate color characteristic standard values in four directions in the database;

Step 4.4. Respectively calculating the color characteristic value in a certain direction, and calculating the color characteristic weight according to the ratio of the corresponding standard color characteristic value.

Furthermore, the method for automatically adjusting the picture according to contents of the picture at the terminal equipment further comprises: presetting the weight coefficients of the weight including human faces, characters, picture textural characteristics and color characteristics by the system, respectively multiplying the calculated weight of the human faces, characters, picture textural characteristics and color characteristics by a coefficient designed by the system, adding to obtain sum of the weight, finally comparing the weight in four directions and adjusting the picture.

Compared with the prior art, the invention has beneficial effects of: judging the direction in which the picture should be adjusted according to the contents of the picture itself, calculating weight of the human faces, characters, picture textural characteristics and color, judging the direction in which the picture should be adjusted according to the weight, avoiding manual operation of the picture, solving the problem that the gravity sensor fails to make corrections, avoiding use of the sensor, and applying to both the mobile equipment and the household computers.

DETAILED DESCRIPTION OF THE INVENTION

The invention is described in further details with reference to the embodiments and attached drawing so as to better explain the technical characteristics and advantages of the invention.

Figure 1:
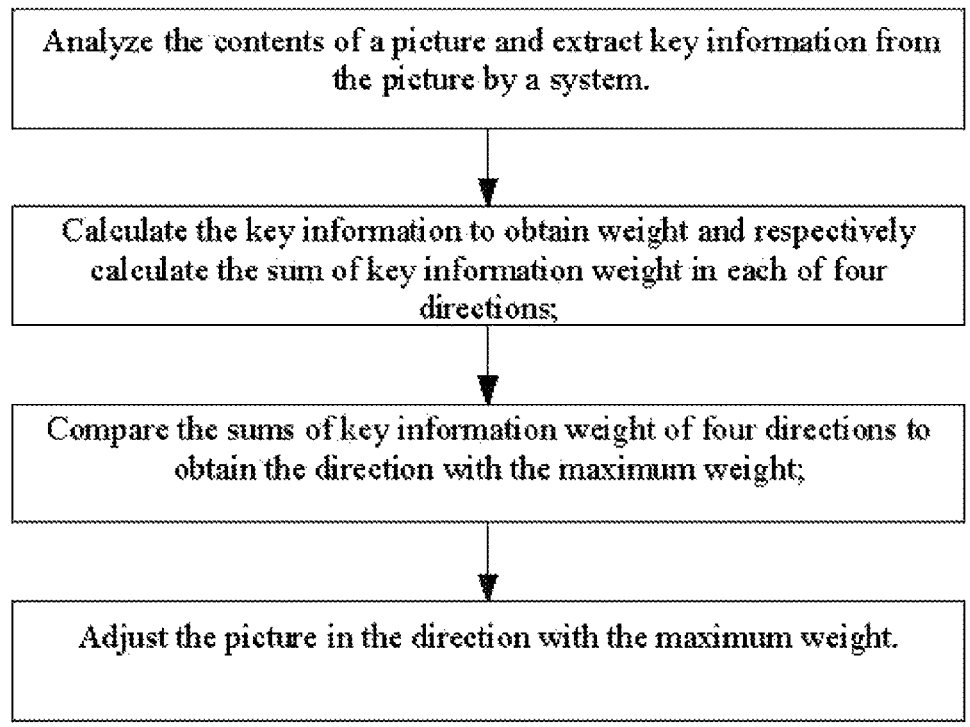
FIG. 1 is a flowchart of the method of the invention.

The method flowchart of the invention can be seen in FIG. 1. A method for automatically adjusting a picture according to contents of the picture at a terminal equipment comprises the following steps:

a. using the terminal equipment comprising a processor and a memory comprising a plurality of program instructions executable by the processor to analyze contents of the picture and extract key information of the picture by a system;

b. using the processor to execute the plurality of program instructions to calculate the key information to obtain weight and respectively calculate a sum of key information weight in each of four directions;

c. using the processor to execute the plurality of program instructions to compare the sums of key information weight of the four directions to find out the direction with the maximum weight;

d. using the processor to execute the plurality of program instructions to adjust the picture in the direction with the maximum weight.

Furthermore, the key information includes human faces, characters, picture textural characteristics and colors, so weights calculated with the key information include human face information weight, character information weight, picture textural characteristic weight and color information weight.

Furthermore, the human face information weight is classified into single-face information weight and multiple-face information weight.

Furthermore, the calculation of the single-face information weight is as follows:

Step 1.1. using the processor to execute the plurality of program instructions to read the left eye, right eye and mouth by face recognition technology, establish triangle relationship, define a connecting line between the mouth and the gravity centre of the triangle as the vector direction of the face direction, then recognize the face direction;

Step 1.2. using the processor to execute the plurality of program instructions to define the face direction as the vector direction, obtain vector angles a1, a2, a3 and a4 between the vector direction and the four directions, then obtain cosine values of the face direction in four directions of the picture, namely cos a1, cos a3, cos a2 and cos a4;

Step 1.3. using the processor to execute the plurality of program instructions to define a cosine value as the image weight of a certain image in the picture, and when calculating the weight, using the processor to execute the plurality of program instructions to set the weight as 0 if the cosine value is smaller than 0.

Furthermore, the calculation of multi-face information weight is as follows: using the processor to execute the plurality of program instructions to calculate the cosine value of each face, average, judge the weight according to the obtained average, and adjust the picture in the direction with the maximum weight.

Furthermore, the calculation of the character information weight comprises:

Step 2.1. using the processor to execute the plurality of program instructions to recognize characters in the picture and define them as vector characters by image-text recognition technology (optical character reader technology);

Step 2.2. using the processor to execute the plurality of program instructions to obtain four cosine values according to the angles between the vector direction and the four directions;

Step 2.3. using the processor to execute the plurality of program instructions to define a cosine value as the character weight of a certain character in the picture, and when calculating the weight, using the processor to execute the plurality of program instructions to set the weight as 0 if the cosine value is smaller than 0.

Furthermore, in the case of multiple characters, using the processor to execute the plurality of program instructions to read averages of character weight of the character information in four directions and define the averages of character weight of the character information in four directions as the character weight of the multiple characters in four directions in the picture.

Furthermore, the calculation of the picture textural characteristic weight comprises.

Step 3.1. using the processor to execute the plurality of program instructions to calculate the textural characteristic information of a classic picture and save the obtained result in a database;

Step 3.2. using the processor to execute the plurality of program instructions to extract textural characteristic values on four directions of the picture to be adjusted, compare the extracted values with the standard numerical values in the database;

Step 3.3. using the processor to execute the plurality of program instructions to respectively search the most approximate textural characteristic values in four directions in the database;

Step 3.4. using the processor to execute the plurality of program instructions to respectively calculate the textural characteristic value in a certain direction, and calculate the textural characteristic weight according to the ratio of the corresponding standard textural characteristic value.

Furthermore, the calculation of the color information weight comprises:

Step 4.1. using the processor to execute the plurality of program instructions to calculate the color characteristic information of a classic picture and save the obtained result in a database;

Step 4.2. using the processor to execute the plurality of program instructions to extract color characteristic values on four directions of the picture to be adjusted, compare the extracted values with the standard numerical values in the database;

Step 4.3. using the processor to execute the plurality of program instructions to respectively searching the most approximate color characteristic standard values in four directions in the database;

Step 4.4. using the processor to execute the plurality of program instructions to respectively calculate the color characteristic value in a certain direction, and calculate the color characteristic weight according to the ratio of the corresponding standard color characteristic value.

Furthermore, the method for automatically adjusting the picture according to contents of the picture at the terminal equipment further comprises: presetting the weight coefficients of the weight including human faces, characters, picture textural characteristics and color characteristics by using the processor to execute the plurality of program instructions, respectively multiplying the calculated weight of the human faces, characters, picture textural characteristics and color characteristics by a coefficient designed by using the processor to execute the plurality of program instructions, adding to obtain sum of the weight, finally comparing the weight in four directions and adjusting the picture.

The invention adjusts the picture according to the contents of the picture itself. The method provided by the invention specifically comprises the following steps. Analyze the contents of the picture and extract key information, namely images (human faces), characters, picture textural characteristics and color information from the picture. Then, calculate information of the four aspects to obtain weight, respectively calculate the weight sums of the four aspects in four directions (up, down, left, right), and compare to obtain the direction most suitable for adjustment (the direction for adjustment is the direction with the maximum weight). In addition, for some pictures of which the key information is difficulty distinguished, other key information and characteristics can be defined for distinguishing.

Calculate weight of the image. Recognize the face direction if an obvious image characteristic in a picture is recognized (use the face detection technology to defect the three most obvious characteristics of the face: left eye, right eye and mouth, establish a triangle relationship, define the connecting line between the mouth and the gravity centre of the triangle as the vector direction of the face direction). Define the face direction as the vector direction, obtain included vector angles a between the vector direction and the four directions (up, down, left, right), and thus obtain cosine values of the face direction in four directions in the picture. The cosine value can be used as the image weight in the picture of a certain image (set the weight as 0 if the cosine value is less than 0). If there are many images in the picture, calculate the cosine value of each image and then use the average as the image weight.

Figure 2:
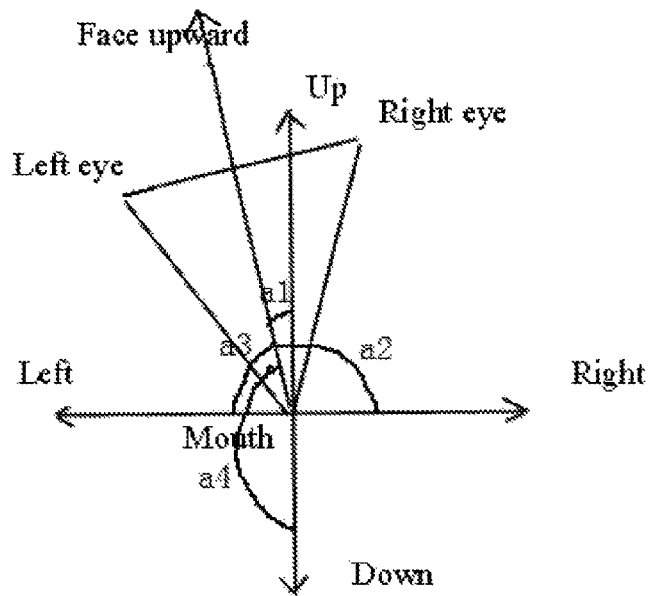
FIG. 2 is a schematic view of the specific embodiment of the invention.

FIG. 2 illustrates a preferable embodiment of the calculation of the face characteristic weight of the invention. The eyes and mouth of the human face is recognized with the face detection technology. In the figure, the triangle represents the three characteristics (left eye, right eye and mouth) of the face. The included angles between the face direction and the four directions respectively are a1, a2, a3 and a4, obviously cos a1>cos a3>cos a2>cos a4. Therefore, the weight is biggest in the upward direction.

Providing there are n images, then weight thereof in a certain direction is:

$$\frac{1}{n}\sum_{n}^{i=1}\cos\alpha_i$$

The weight calculation method for characters is similar to that of the image. The characters are judged through character recognition algorithm (classic algorithm or own character recognition algorithm). Identical to the image judgment method, the weight calculation method for characters also includes the steps of judging the vector direction of the characters, obtaining the included angles between the vector direction and the four directions, obtaining four cosine values and the calculating the weight. If there are many characters, average them.

For the method for calculating the textural characteristic and color information, those two characteristics have little effect, and each can be provided with maximum weight of 0.5. Some classic pictures (with obvious textural characteristics and color information) can be processed in advanced and placed in the database. The method includes steps of extracting the textural characteristics (using some classic textural characteristic extraction technologies, such as the gray-level co-occurrence matrix-based textural characteristic extraction method) and the color information of a picture, respectively comparing with the numerical values in the classic database, obtaining the most approximate numerical values, calculating the ratio, and then multiplying by 0.5.

For example, set the ratio of the face to character to textural characteristic to color as 7:2:0.5:0.5, and then the weight of the picture=face*7+character*2+textural character*0.5+color*0.5.

For some pictures which are difficulty distinguished through the above mentioned information characteristics, such as some abstract pictures, other characteristics can be self-defined. For example, extract the contour characteristic of the picture, calculate the gravity centre of the contour, and adjust the direction towards the direction where the gravity centre is the lowest. Such result may mostly conform to the aesthetic habit of people.

In addition, the above algorithms for calculating the image, character, textural characteristic and color information are for reference only. Optimized or better algorithms can be used in actual operation.

For example, another method includes calculating the weight of each of four directions, respectively obtaining the sum of weight (W1, W2, W3, W4) in the four directions, and defining the direction with the maximum sum of weight as the adjustment direction. The image characteristic is detected first; then, cosine values 1, −1, 0, 0 in four directions (up, down, left, right) are obtained through calculating the vector of the image direction and the cosine values of the included vector angels in the four direction. So, the image characteristic weight is 1, 0, 0, 0. The character characteristics are not recognized, so the character characteristic weight in four directions is 0. The extracted textural characteristic and the color characteristic are proportioned to the classic numerical values and then multiplying by 0.5 to generate corresponding numerical values. Finally. W1 obtains the maximum sum of weight, so the picture is upward.

The above contents are further description of the invention with reference to the preferable embodiments, which cannot be regarded as the limitation of the invention. For those skilled in the field, plural simple deductions or substitutions can be made on the premise of the concept of the invention, which all fall within the protective scope as claimed by the invention.

What is claimed is:

1. A method for automatically adjusting a picture according to contents thereof at a terminal equipment, comprising the following steps:
   a. using the terminal equipment comprising a processor and a memory comprising a plurality of program instructions executable by the processor to analyze contents of the picture and extract key information of the picture;
   b. using the processor to execute the plurality of program instructions to calculate the key information to obtain weight and respectively calculate a sum of key information weight in each of four directions;
   c. using the processor to execute the plurality of program instructions to compare the sums of key information weight of the four directions to find out the direction with the maximum weight;
   d. using the processor to execute the plurality of program instructions to adjust the pictures according to the direction with the maximum weight;
   wherein the key information includes human faces, characters, picture textural characteristics and colors, so weight calculated on the basis of the key information includes human face information weight, character information weight, picture textural characteristic weight and color information weight, the human face information weight is classified into single-face information weight and multiple-face information weight, the multi-face information weight is calculated by using the processor to execute the plurality of program instructions to average a cosine value of each face, the character information weight is classified into a character weight of a certain character in the picture and a character weight of multiple characters in the picture, the character weight of multiple characters in the picture is calculated by using the processor to execute the plurality of program instructions to average character weight of the several character information in each of four directions; and
   wherein the processor is used to execute the plurality of program instructions to preset weight coefficients of the weight including human faces, characters, picture textural characteristics and color characteristics, respectively multiply the calculated weight of the human faces, characters, picture textural characteristics and color characteristics by a coefficient designed by using the processor to execute the plurality of program instructions, add together to obtain sum of the weight finally compare the weight in four directions and adjust the picture.

2. The method for automatically adjusting the picture according to con of the picture at the terminal equipment according to claim 1, characterized in that the calculation of the single-face information weight comprises:
   Step 1.1. using the processor to execute the plurality of program instructions to read the left eye, right eye and mouth by face recognition technology, establish triangle relationship, define a connecting line between the month and the gravity centre of the triangle as the vector direction of the face direction, then recognize the face direction;
   Step 1.2. using the processor to execute the plurality of program instructions to define the face direction as the vector direction, obtain vector angles a1, a2, a3 and a4 between the vector direction and the four directions, then obtain cosine values of the face direction in four directions of the picture, namely cos a1, cos a3, cos a2 and cos a4;
   Step 1.3. using the processor to execute the plurality of program instructions to define the cosine value as the image weight of a certain image in the picture, and when calculating the weight, using the processor to execute the plurality of program instructions to set the weight as 0 if the cosine value is smaller than 0.

3. The method for automatically adjusting the picture according to contents of the picture at the terminal equipment according to claim 2, characterized in that the calculation of multi-face information weight comprises: using the processor to execute the plurality of program instructions to calculate the cosine value of each face, average, judge the weight according to the obtained average, and adjust the picture in the direction with the maximum weight.

4. The method for automatically adjusting the picture according to contents of the picture at the terminal equipment according to claim 1, characterized in that the calculation of the character information weight comprises:
   Step 2.1. using the processor to execute the plurality of program instructions to recognize characters in the picture and define them as vector characters by image-text recognition technology;
   Step 2.2. using the processor to execute the plurality of program instructions to obtain four cosine values according to the angles between the vector direction and the four directions;
   Step 2.3. using the processor to execute the plurality of program instructions to define a cosine value as the character weight of a certain character in the picture, and when calculating the weight, using the processor to execute the plurality of program instructions to set the weight as 0 if the cosine value is smaller than 0.

5. The method for automatically adjusting the picture according to contents of the picture at the terminal equipment according to claim 4, characterized in that in the case of multiple characters, using the processor to execute the plurality of program instructions to read the average of character weight of the several character information in each of four directions and define the average of character weight of the several character information in each of four directions as the character weight of the multiple characters in four directions in the picture.

6. The method for automatically adjusting, the picture according to contents of the picture at the terminal equipment according to claim 1, characterized in that the calculation of the picture textural characteristic weight comprises:
   Step 3.1. using the processor to execute the plurality of program instructions to calculate the textural characteristic information of a classic picture and save the obtained result in a database in advance;
   Step 3.2. using the processor to execute the plurality of program instructions to extract textural characteristic values in four directions of the picture to be adjusted, compare the extracted values with the standard numerical values in the database;
   Step 3.3. using the processor to execute the plurality of program instructions to respectively search the most approximate textural characteristic standard values in four directions in the database;
   Step 3.4. using the processor to execute the plurality of program instructions to respectively calculate the textural characteristic value in a certain direction, and calculate the textural characteristic weight according to the ratio of the corresponding standard textural characteristic value.

7. The method for automatically adjusting the picture according to contents of the picture at the terminal equipment according to claim 1, characterized in that the calculation of the color information weight comprises:

Step 4.1. using the processor to execute the plurality of program instructions to calculate the color characteristic information of a classic picture and save the obtained result in a database in advance;

Step 4.2. using the processor to execute the plurality of program instructions to extract color characteristic values in four directions of the picture to be adjusted, compare the extracted values with the standard numerical values in the database;

Step 4.3. using the processor to execute the plurality of program instructions to respectively search the most approximate color characteristic standard values in four directions in the database;

Step 4.4. using the processor to execute the plurality of program instructions to respectively calculate the color characteristic value in a certain direction, and calculate the color characteristic weight according to the ratio of the corresponding standard color characteristic value.

* * * * *